(12) United States Patent
Holman et al.

(10) Patent No.: US 9,170,474 B2
(45) Date of Patent: Oct. 27, 2015

(54) EFFICIENT SPATIALLY MODULATED ILLUMINATION SYSTEM

(75) Inventors: Robert Holman, San Jose, CA (US); Matthew Brian Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 211 days.

(21) Appl. No.: 13/529,913

(22) Filed: Jun. 21, 2012

(65) Prior Publication Data

US 2013/0343053 A1 Dec. 26, 2013

(51) Int. Cl.
| | |
|---|---|
| *F21V 33/00* | (2006.01) |
| *G03B 21/00* | (2006.01) |
| *H04N 5/74* | (2006.01) |
| *H04N 9/31* | (2006.01) |
| *G03B 21/20* | (2006.01) |

(52) U.S. Cl.
CPC ............ *G03B 21/00* (2013.01); *G03B 21/2013* (2013.01); *G03B 21/2033* (2013.01); *G03B 21/2066* (2013.01); *H04N 5/7408* (2013.01); *H04N 9/31* (2013.01); *H04N 9/3152* (2013.01)

(58) Field of Classification Search
USPC .......... 362/237, 241, 240, 245, 307, 328, 342
See application file for complete search history.

(56) References Cited

U.S. PATENT DOCUMENTS

| | | | |
|---|---|---|---|
| 7,310,186 B2 | 12/2007 | Lerner et al. | |
| 7,357,530 B2 | 4/2008 | Wang et al. | |
| 7,403,332 B2 | 7/2008 | Whitehead et al. | |
| 7,404,644 B2 | 7/2008 | Evans et al. | |
| 7,604,355 B1 | 10/2009 | Peng | |
| 7,659,971 B2 | 2/2010 | Warden et al. | |
| 7,670,006 B2 | 3/2010 | Lieberman | |
| 8,047,660 B2 * | 11/2011 | Penn et al. ................... 353/102 |
| 2004/0263346 A1 | 12/2004 | Neal | |
| 2005/0157263 A1* | 7/2005 | Sakata et al. ................... 353/20 |
| 2005/0174771 A1 | 8/2005 | Conner | |
| 2006/0002141 A1 | 1/2006 | Ouderkirk et al. | |
| 2006/0170883 A1 | 8/2006 | Matsui | |

(Continued)

FOREIGN PATENT DOCUMENTS

| | | |
|---|---|---|
| DE | 102008061556 A1 | 9/2009 |
| EP | 2461086 A1 | 6/2012 |

(Continued)

OTHER PUBLICATIONS

Bogaert, et al., "Analysis of Two Novel Concepts for Multiview Three-Dimensional Displays Using One Projector", Optical Engineering [Online], vol. 49, Issue 12, Dec. 2010 127401:1-127401:9.

(Continued)

*Primary Examiner* — Laura Tso
(74) *Attorney, Agent, or Firm* — Knobbe, Martens, Olson & Bear, LLP (57) ABSTRACT

A projector can include a projection lens that is positioned substantially one focal length away from a spatial light modulator. The projector may also include a non-imaging optic configured to illuminate the spatial light modulator. The non-imaging optic may include a light emitter and an etendue-preserving reflector. The projector can be configured to project an image created by the spatial light modulator at a distance using light from the non-imaging optic.

26 Claims, 4 Drawing Sheets

(56) References Cited

U.S. PATENT DOCUMENTS

| | | |
|---|---|---|
| 2008/0037271 A1 | 2/2008 | Grace et al. |
| 2009/0002985 A1 | 1/2009 | Peck et al. |
| 2009/0185141 A1 | 7/2009 | Chen et al. |
| 2010/0053959 A1 | 3/2010 | Ijzerman et al. |
| 2010/0141905 A1 | 6/2010 | Burke |
| 2011/0002019 A1 | 1/2011 | Routley et al. |
| 2011/0096570 A1 | 4/2011 | Vissenberg et al. |
| 2011/0116051 A1 | 5/2011 | Young et al. |
| 2011/0205049 A1 | 8/2011 | Kmetec |
| 2011/0260178 A1 | 10/2011 | Bierhuizen |
| 2012/0002256 A1* | 1/2012 | Lacoste et al. .............. 359/9 |
| 2012/0038693 A1 | 2/2012 | Kang et al. |
| 2013/0343051 A1 | 12/2013 | Holman |

FOREIGN PATENT DOCUMENTS

| | | |
|---|---|---|
| JP | 2008-210712 A | 9/2008 |
| WO | 2008123283 A1 | 10/2008 |

OTHER PUBLICATIONS

International Search Report and Written Opinion—PCT/US2013/046162—ISA/EPO—Sep. 4, 2013.

International Search Report and Written Opinion—PCT/US2013/046167—ISA/EPO—Sep. 24, 2013.

Gotoda, Hironobu, "Reduction of Image Blurring in an Autostereoscopic Multilayer Liquid Crystal Display", Proceedings of SPIE-IS&T Electronic Imaging, SPIE vol. 7863, 2011, pp. 786321-1-786321-7.

\* cited by examiner

EFFICIENT SPATIALLY MODULATED ILLUMINATION SYSTEM

TECHNICAL FIELD

This disclosure relates to light projectors.

DESCRIPTION OF THE RELATED TECHNOLOGY

Projectors are often used in theatrical and architectural applications, as well as many others, to project a pattern of light onto a surface. The pattern may be, for example, an ornamental design that is projected onto a wall of a theatrical set, or a business logo projected onto a wall in a reception area. Many projectors are known in the art. These imaging projectors typically form a sharply-focused image at a specific image plane. If these imaging projectors are to be used at multiple different projection distances, they typically require a mechanism for adjusting the focus of the projector lens. This allows the projector to form a substantially sharply-focused image at different projection distances. However, a focus adjustment mechanism adds additional expense to the projector. In addition, a human operator may be required to manually adjust the focus of the projector, or the projected pattern, whenever the intended application changes. Sometimes the location of the projector makes it difficult or inconvenient for manual adjustment.

SUMMARY

The systems, methods and devices of the disclosure each have several innovative aspects, no single one of which is solely responsible for the desirable attributes disclosed herein.

Innovative aspects of the subject matter described in this disclosure can be implemented in a projection device comprising: a first lens, the first lens having a first focal length and a first optical axis; a spatial light modulator positioned substantially one first focal length away from the first lens along the first optical axis; and a light source configured to illuminate the spatial light modulator, wherein the light source includes a light emitter and an etendue-preserving reflector, wherein the device is configured to project a pattern created by the spatial light modulator at a distance using light from the light source. The light source can include an array of light emitters. In addition, the projection can further comprise a second lens, the second lens having a second focal length and a second optical axis that is aligned with the first optical axis, the second lens being positioned substantially one second focal length away from the spatial light modulator on a side of the spatial light modulator opposite the first lens, wherein the light source is configured to illuminate the clear aperture of the second lens, and wherein the output plane of the light source is positioned substantially one second focal length away from the second lens such that the light source and the second lens together provide enhanced uniformity of light at the location of the spatial light modulator.

In another implementation, a method of fabricating a projection device comprises: providing a first lens, the first lens having a first focal length and a first optical axis; providing a spatial light modulator positioned substantially one first focal length away from the first lens along the first optical axis; and providing a light source configured to illuminate the spatial light modulator, wherein the light source includes a light emitter and an etendue-preserving reflector, wherein the device is configured to project a pattern created by the spatial light modulator at a distance using light from the light source.

In another implementation, a projection device comprises: means for producing a beam of light, wherein the light beam production means includes means for preserving etendue of the beam of light; means for producing a spatial pattern to be illuminated by the beam of light; and focusing means for imaging the spatial pattern production means, the focusing means being associated with a focal length and an optical axis, the focusing means being positioned substantially one focal length away from the spatial pattern production means along the optical axis, wherein the device is configured to project the spatial pattern at a distance.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

The following detailed description is directed to certain implementations for the purposes of describing various innovative aspects. However, the teachings herein can be applied in a multitude of different ways.

Various implementations of a projector are described herein. In some implementations, a projector may include one or more light sources that illuminate a spatial light modulator that forms a desired pattern that is to be projected at a distance. The spatial light modulator may be located substantially one focal length away from a field lens. The field lens collimates light from the spatial light modulator, thus projecting an image of the pattern created by the spatial light modulator at a distance.

Since light from the spatial light modulator is substantially collimated in some implementations, the pattern is projected to infinity. Accordingly, the pattern can be projected at substantially different distances from the projector to a projection surface without requiring a focusing mechanism and focus adjustments. Such a projector can be used, for example, as a compact and cost-effective source of information (e.g., text, graphics, pictures, videos, decorative illumination, etc.) that is to be conveyed to a distant wall, floor, or ceiling.

Figure 1:
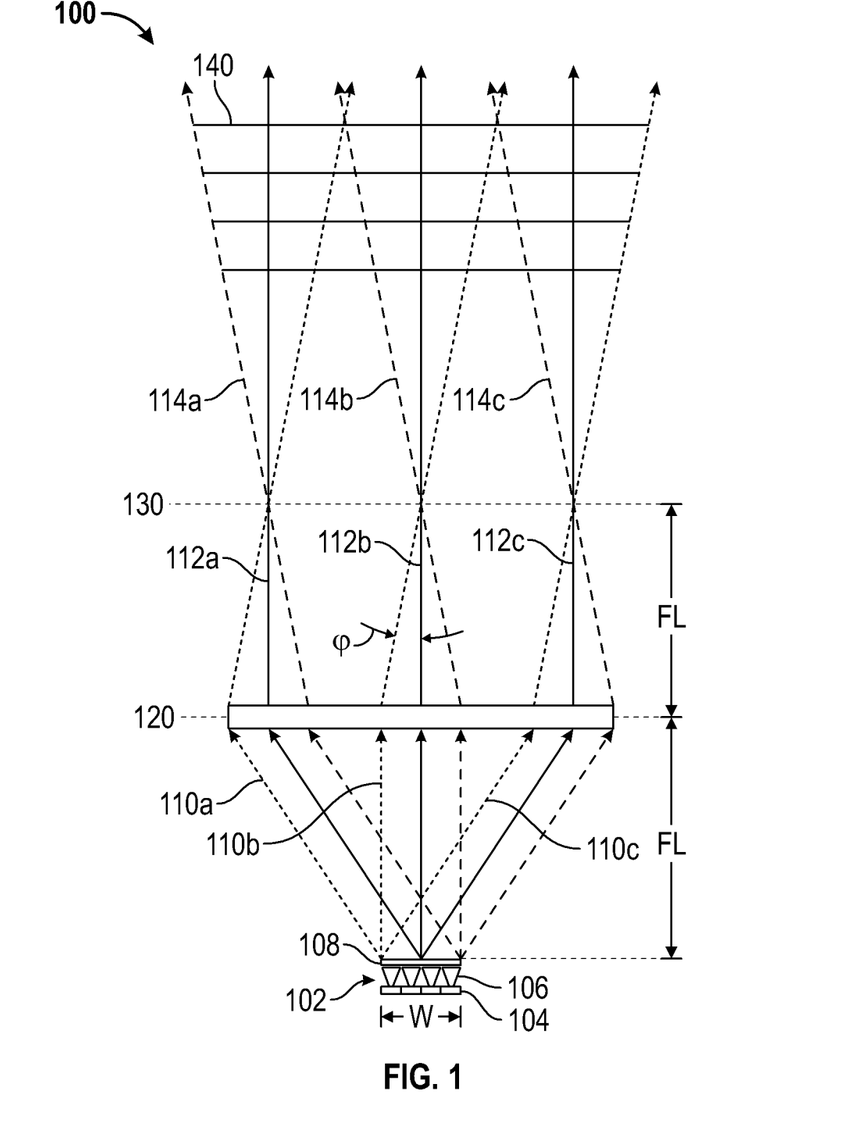
FIG. 1 is a schematic illustration of an example of a projector.

FIG. 1 is a schematic illustration of an example of a projector 100. The projector 100 includes one or more light sources 102 that illuminate a spatial light modulator 108. The spatial light modulator 108 creates a desired light pattern using the light from the sources 102. The light then passes to a field lens 120. The field lens 120 projects the light pattern created by the spatial light modulator at a distance.

The projector 100 can include an array of multiple light sources 102, or a single light source, for illuminating the spatial light modulator 108. In the case of an array of multiple light sources 102, the array can have, for example, a two-dimensional lattice structure. In some implementations, the light sources 102 utilize non-imaging optics. For example, each light source 102 can include a light emitter 104 and a corresponding reflector 106. Each light emitter 104 can be, for example, a light emitting diode (LED), though other light emitters can also be used. In some implementations, the light emitters 104 are surface emitting LEDs which output light over a generally hemispherical range of angles. Each corresponding reflector 106 can be used to collect light from the range of angles at which light is emitted from a light emitter 104, and to direct the light toward the field lens 120. In some implementations, the light sources 102 output substantially white light, though they can also be selected to output any color, or combination of colors.

The spatial light modulator 108 can be any optical element that can be used to create a desired pattern (e.g., any arbitrary design, picture, graphic, text, image, etc.), whether static or time-varying, that is to be projected at a distance. The desired pattern can be monochromatic or polychromatic. In some implementations, the spatial light modulator 108 creates a fixed pattern that is to be projected at a distance. In such implementations, the spatial light modulator 108 can be, for example, a stencil with spatially-varying transmissive, absorptive, reflective, and/or opaque areas arranged in a desired pattern. In some implementations, the spatial light modulator 108 is a component that can create a variable pattern that is to be projected at a distance. In such implementations, the spatial light modulator 108 can include an array of pixels whose optical characteristics (e.g., transmissivity, absorptivity, reflectivity, and/or opaqueness) can be individually controlled to create a desired pattern. For example, the spatial light modulator in such implementations can be a liquid crystal display (LCD) panel that is communicatively coupled to a controller for forming various patterns with the LCD panel.

Patterned light from the spatial light modulator 108 passes to the field lens 120. The field lens 120 in the projector 100 can be, for example, a positive power lens, with one or more optical elements. The optical element(s) can include, for example, biconvex lens elements, plano-convex lens elements, meniscus lens elements, Fresnel lens elements, etc. In addition, the optical element(s) can be refractive or diffractive. As illustrated in FIG. 1, the field lens 120 has a focal length, FL. For reference purposes, an optical axis can be defined as the longitudinal axis that passes through the optical center of the field lens 120.

In some implementations, the field lens 120 is positioned substantially one focal length, FL, away from the spatial light modulator 108 along the optical axis. For example, the field lens 120 can be positioned substantially one focal length, along the optical axis, away from the output plane of the spatial light modulator 108. This relationship between the spatial light modulator 108 and the field lens 120 establishes a projection condition, which is schematically shown in FIG. 1. In some implementations, the field lens 120 is placed exactly at, within manufacturing tolerances, one focal length away from the output plane of the spatial light modulator 108, in which case, the replica of the pattern created by the spatial light modulator 108 is in focus at infinity. In some implementations, the placement of the field lens 120 will be close to, but not necessarily exactly at, one focal length away from the output plane of the spatial light modulator 108 so that the pattern created by the spatial light modulator 108 is in focus not nearer than 100 times the focal length of the field lens 120, or not nearer than 200 times the focal length, or not nearer than 500 times the focal length. In some implementations, the field lens is disposed substantially one focal length away from the output plane of the spatial light modulator 108 to within 1%, 2%, or 5% of the focal length. In situations where the surface onto which the beam pattern 140 is intended to be projected is at a fixed distance from the field lens 120, relay and/or projection lens approaches (i.e., additional relay lenses can be added to the system) can be used to alter the focal plane of the optical system to the intended surface.

With reference to FIG. 1, light from the light sources 102 is incident upon the spatial light modulator 108 from below. This light is spatially modulated, forming a desired light pattern, and is then transmitted to the field lens 120. For purposes of illustration, three different groups of three light rays are shown emanating from different areas of the array of the spatial light modulator 108. A group of three dotted rays (110a, 110b, and 110c) are shown emanating from the left-hand portion of the spatial light modulator 108, while a group of three solid rays (112a, 112b, and 112c) emanate from the middle of the spatial light modulator 108, and a group of three dashed rays (114a, 114b, and 114c) emanate from the right-hand portion of the spatial light modulator 108. As mentioned above, the output plane of the spatial light modulator 108 can be located substantially one focal length away from the field lens 120. Thus, the field lens 120 collimates the beams of light 110 (110a, 110b, and 110c), 112 (112a, 112b, and 112c), and 114 (114a, 114b, and 114c) from the spatial light modulator 108, and projects a light pattern 140, that corresponds to a pattern created by the spatial light modulator 108, to infinity.

For example, as illustrated in FIG. 1, the three solid rays (112a, 112b, and 112c) emanating from the middle of the spatial light modulator 108 are collimated and emerge from the field lens 120 substantially parallel in the vertical direction. The three dotted rays (110a, 110b, and 110c) from the left-hand side of the spatial light modulator 108 are collimated and emerge from the field lens 120 as parallel rays that are angularly offset from the vertical optical axis to the right, while the three dashed rays (114a, 114b, and 114c) from the right-hand side of the spatial light modulator 108 are collimated and emerge from the field lens 120 as parallel rays that are angularly offset to the left of the optical axis.

Moreover, the light rays emanating from each portion of the spatial light modulator 108 are averaged at each point in the field lens's output focal plane 130. Accordingly, there is no useful image at the output focal plane 130. For example, as shown in FIG. 1, light rays 110a, 112a, and 114a are each averaged at a point in the output focal plane 130, while the same is true for light rays 110b, 112b, and 114b, and for light rays 110c, 112c, and 114c, respectively. A continuum of effective point sources are created at the output focal plane 130 of the field lens 120, each radiating light in fixed angular cones, and each having a constant far field projection angle, $\phi$, equaling arctan $[(W/2)/FL]$, where W is the aperture width of the array of light sources 102 and arctan is the arc tangent function.

The far field projection angles, $\phi$, of the beams of light 110, 112, and 114 in the meridian that is illustrated in FIG. 1 depend on the width, W, of the spatial light modulator 108 in that meridian. Similarly, the far field projection angles in the orthogonal meridian (not shown) depend on the width W' of the spatial light modulator 108 in that meridian (which may or may not be the same as W). When W=W,' the projected pattern 140 may be generally square-shaped (depending upon the shape of the array of light sources 102). When W does not equal W,' the projected pattern 140 may become generally rectangular-shaped. Whether square or rectangular, however, the optical uniformity is particular even because of the spatial averaging that occurs at the output focal plane of the field lens 120, where each point represents an average of all emitting points at the output of the spatial light modulator 108.

In this way, the field lens 120 projects at or near infinity (e.g., at least two orders of magnitude greater than the focal length of the lens, for example 200 times the focal length of the field lens, away from the field lens) an image of the spatial light modulator 108. Since the beams of light 110, 112, and 114 are focused far away, as mentioned above, the light pattern created by the spatial light modulator 108 maintains a similar appearance regardless of the distance from the projector 100 so long as the distance between the projection surface and the field lens, for example, 15 times the focal length of the field lens or more (though the illumination pattern does increase in size with increasing distance from the projector).

The projector 100 can be simplified because it does not require a mechanism for changing the focus distance. Accordingly, no human operator or automatic focus-adjusting mechanism is needed to set up or adjust the focus of the projector 100 for a given application. The projector 100 implements a trade-off in which reduced cost and increased ease of use are favored over creating a high-resolution projected optical image of the spatial light modulator 108 at a particular finite distance.

As a result of the collimated beams 110, 112, and 114 which exit the field lens 120, in some implementations the projector 100 does not include any mechanism for adjusting the focus of the projector, for example, by altering the distance between the field lens 120 and the spatial light modulator 108. In some implementations, the field lens 120 and the spatial light modulator 108 are fixed with respect to one another by, for example, a housing. In addition, in order to make for a compact design, in some implementations the projector 100 does not include additional optical components apart from the light emitters 104, reflectors 106, spatial light modulator 108, and field lens 120.

In some implementations suitable for a microprojector, for example, the array of light sources and spatial light modulator can be made to be very small. For example, the array of light emitters 104 could be shaped in a square (or a circle) with a side (diameter) having a dimension from about 50 microns to about 6 mm. The spatial light modulator could similarly range, in various implementations, between 50 microns to about 6 mm. In some implementations, the array of light emitters 104 can have a dimension, such as a side or a diameter, less than 6 mm. As one illustrative example of a relatively small LED or OLED array, each LED could be about 10 microns in size, and the array can be formed in a 5 by 5 arrangement. In various microprojector implementations, the reflectors 106 could include a microstructure of reflectors having a reflector height ranging from about 50 microns to 12 mm. For a microprojector implementation, the lens diameter may range from, for example, 200 microns to 12 mm, with a focal length ranging from, for example, 500 microns to 12 mm. In one implementation, a microprojector can include a compact flashlight with a controllable beam pattern, or a controllable illuminator for controllably illuminating different portions of a keyboard of a laptop, for example. In some larger implementations, more suitable for commercial or theatrical lighting environments, the lens diameter may range from, for example, about 12 mm to about 305 mm (~12 inches), with a focal length ranging from, for example, about 12 mm to about 610 mm (~24 inches). For such an implementation, the array of light emitters 104 could be shaped in a square (or a circle) with a side (diameter) having a dimension, for example, from about 6 mm to about 51 mm (~2 inches). Reflectors 106 can range in height from, for example, 12 mm to about 152 mm (~6 inches). With such compact designs, a beam projector can be provided that is, for example, 50% to 15% of the size of conventional lighting solutions providing similar brightness and illumination.

Figure 2:
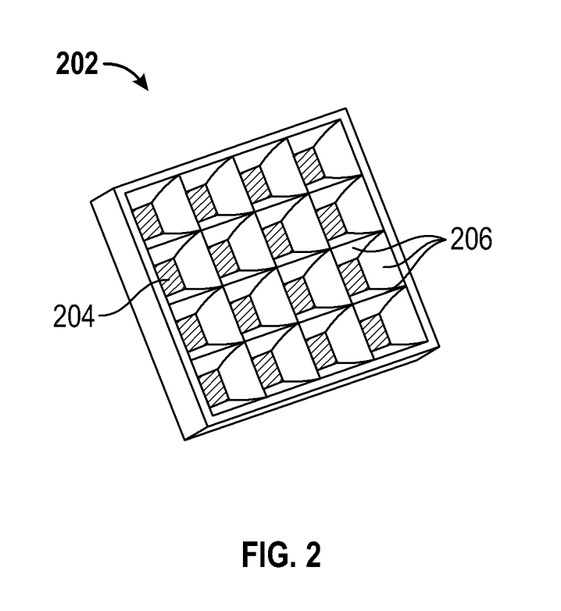
FIG. 2 is a perspective view of an example of an array of light sources that includes a plurality of light emitters with a corresponding plurality of reflectors.

FIG. 2 is a perspective view of an example of an array of light sources 202 that includes a plurality of light emitters 204 with a corresponding plurality of reflectors 206. The array of light sources 202 is an example implementation of the array of light sources 102 that is schematically illustrated in FIG. 1. In the illustrated implementation, the array of light sources 202 is made up of a 4×4 two-dimensional array of individual light emitters 204, though a variety of different numbers and arrangements of light emitters can be used (including a single light emitter and corresponding reflector). As already discussed, the light emitters 204 can be, for example, LEDs. In some implementations, each light emitter 204 has a corresponding reflector 206. For example, each light emitter 204 can be positioned within a reflector. In some implementations, each reflector 206 includes one or more reflective sidewalls made up of, for example, metallic or dielectric material. The reflective sidewalls can extend from the boundaries of the corresponding light emitter 204. The reflective sidewalls can be shaped to direct all, or substantially all, of the light from a light emitter 204 toward the field lens 120. The reflectors 206 may also be designed to homogenize the light that is incident upon the field lens 120.

In some implementations, the reflectors 206 are etendue-preserving reflectors. In other words, each reflector 206 is etendue-matched to the corresponding light emitter 204. For example, each reflector 206 can be configured so as to substantially match the angular spread of the output beam of light from its corresponding light emitter 204 to the acceptance cone of the field lens 120. In addition, the reflectors 206 can be configured so as to substantially match the diameter of the beams from the light emitters 204, at the point where they are incident upon the field lens 120, to the clear aperture of the field lens. The specific shape of the sidewalls of a reflector 206 in any given implementation may be dependent upon, for example, the emitting pattern of the corresponding light emitter 204, the distance to the field lens 120, etc. In some implementations, since the reflectors 206 are etendue-matched to the corresponding light emitters 204, the reflectors 206 can reduce or eliminate wasted light by forming beams whose spatial and angular extent are such that all, or substantially all, of the light from the light emitters 204 (via the spatial light modulator 108) falls within the acceptance cone of the field lens 120 and passes through its clear aperture. In this way, the etendue-preserving reflectors 206 increase the efficiency of the projector.

Although in some implementations it may be possible to use other optical components besides the reflectors 206 to direct light from the light emitters 204 towards the field lens 120 (via the spatial light modulator 108), the reflectors 206 have the advantageous capability of being able to process relatively wide-angle light from the light emitters 204 and to effectively direct it toward the field lens 120. For example, in the case where each light emitter 204 emits light over a hemispherical range of angles, it may be difficult to capture all of that light with other types of optical components, such as lenses, and direct it towards the field lens 120. Unfortunately, any light from a light emitter 204 that does not reach the clear aperture of the field lens 120, at an angle that is within the acceptance cone of the field lens 120, does not contribute to the useful formation of a light pattern 140 that is a replica of the pattern created by the spatial light modulator 108. Thus, the efficiency of the projector is reduced due to this lost light. The reflectors 206, however, are able to process wide-angle light and effectively direct it to the field lens 120, thus increasing efficiency.

Figure 3:
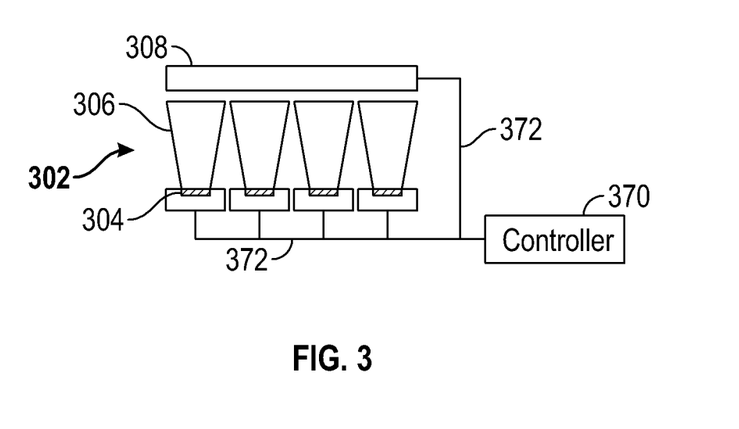
FIG. 3 is a cross-sectional schematic illustration of an example of an array of light sources, a spatial light modulator, and a controller for controlling the power level of the light sources as well as the pattern created by the spatial light modulator.

FIG. 3 is a cross-sectional schematic illustration of an example of an array of light sources 302, a spatial light modulator 308, and a controller 370 for controlling the power level of the light sources as well as the pattern created by the spatial light modulator. The array of light sources 302, with the controller 370, is an example implementation of the array of light sources illustrated elsewhere herein (for example, 102 in FIG. 1). The controller 370 can be used to set the power level of the light emitters 304 in the array 302 (for example, via the control lines 372). The controller 370 can be used to selectively and independently set the power level of the individual light emitters 304 in the array 302 (for example, via the control lines 372), thus allowing for the creation of a variety of light patterns using the array of light sources 302. For example, the power level of each individual light emitter 304 can be controlled by switching between an ON state (full power) and an OFF state (zero power). Alternatively, the power level of each individual light emitter 304 can have several discrete power values, or even a continuous range of power values between the ON and OFF states. By switching the individual light emitters 304 to different power values, a wide variety of beam patterns can be created. In addition, the controller 370 can control the pattern created by the spatial light modulator 308. For example, the controller can use picture data, image data, graphic data, text data, video data, etc., transmitted via one or more control lines 372, to create time-varying patterns with the spatial light modulator 308. Such data can be used, for example, to separately and individually control pixels in the spatial light modulator 308 to transmit, reflect, absorb, and/or block different amounts of light depending upon the spatial location of each pixel in the spatial light modulator. In this way, a wide variety of projected patterns 140 can be created. This can be done, for example, electronically and remotely without physically accessing or manipulating the optics of the projector 100.

In some implementations, the controller 370 includes a receiver with, for example, a wired or wireless interface for receiving remote command signals. The controller 370 can process a command signal and then control, for example, the spatial light modulator 308 to form a pattern that corresponds to the received command signal. In some implementations, the receiver interface of the controller 370 may be communicatively coupled with a remote control device via the Internet, Bluetooth, Wi-Fi (Institute of Electrical and Electronics Engineers (IEEE) 802.11 standards), etc. In addition, the remote device can be a computer (e.g., desktop, laptop, tablet), a cell phone, etc.

If an array of light emitters 304 and corresponding reflectors 306 are used instead of a single light emitter/reflector pair, the resulting projected pattern (for example, 140) may include noticeable artifacts resulting from brightness variations due to, for example, the spacing between the light emitters, the reflector sidewalls, etc. However, such artifacts can be reduced using the implementation illustrated in FIG. 4.

Figure 4:
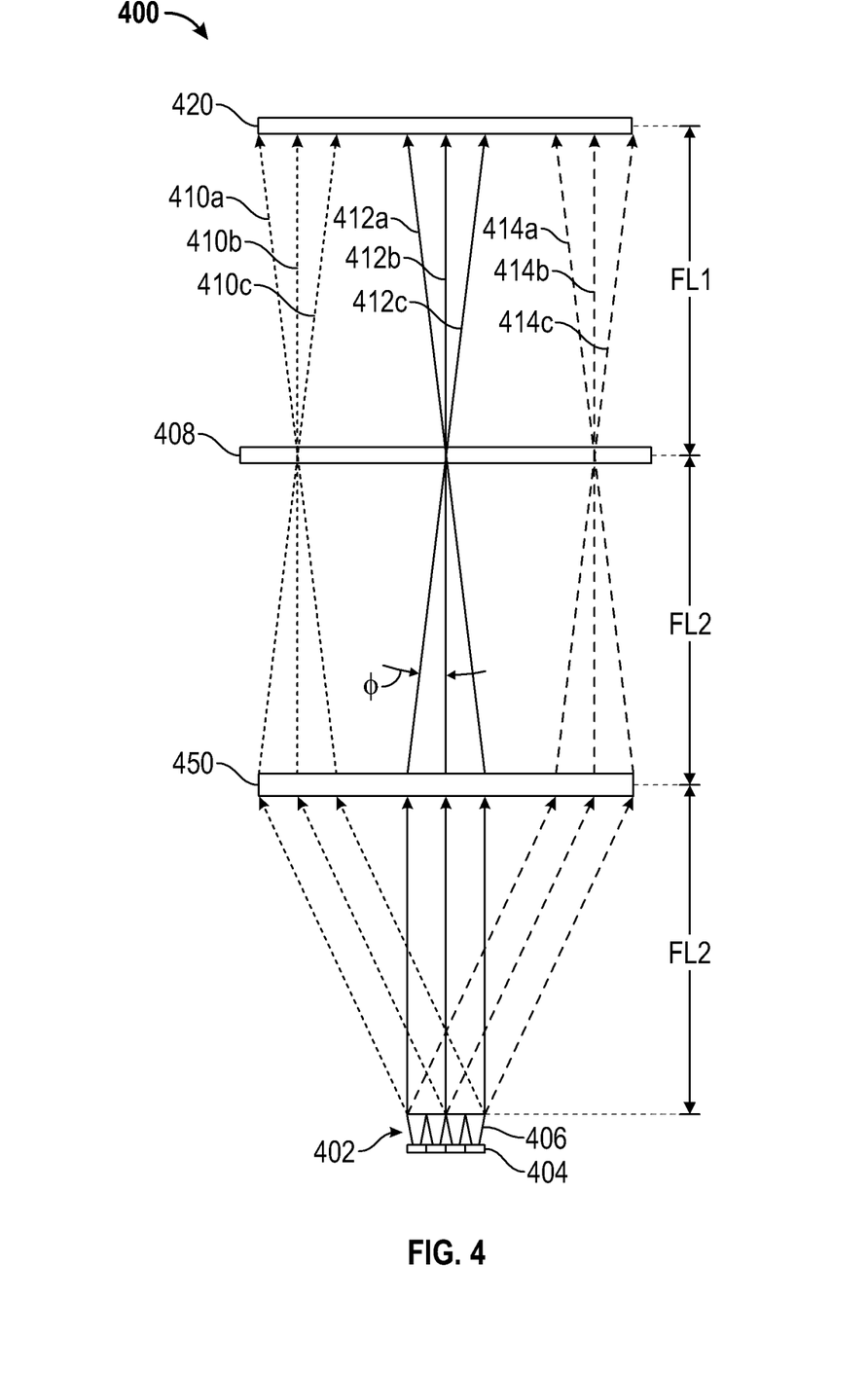
FIG. 4 is a schematic illustration of an example of a projector that includes a lens that is used to enhance the uniformity of the illumination of a spatial light modulator by an array of light sources.

FIG. 4 is a schematic illustration of an example of a projector 400 that includes a lens 450 that is used to enhance the uniformity of the illumination of a spatial light modulator 408 by an array of light sources 402. The array of light sources 402, the spatial light modulator 408, and the field lens 420 can be similar to others described herein (e.g., 102, 108, and 120, respectively, in FIG. 1). However, the projector 400 in FIG. 4 includes two different lenses: the field lens 420; and a brightness homogenizing lens 450. The field lens 420 and the spatial light modulator 408 are arranged as discussed elsewhere herein. Namely, the spatial light modulator 408 is separated from the field lens 420 by the focal length FL1 of the field lens. Thus, the field lens 420 projects the spatial light modulator pattern to infinity, as discussed herein.

The projector 400 also includes an array of light sources 402, which may each include a light emitter 404 and a corresponding reflector 406, as discussed herein (a single light emitter with an etendue-preserving reflector can also be used). Spatial variations in the brightness of the light from the array of light sources may result from, for example, the spacing between the light emitters 404, the boundaries between reflectors 406, etc. As mentioned above, such brightness variations may result in noticeable artifacts in the projected light pattern. However, such brightness variations can be reduced by the homogenizing lens 450.

The projector 400 is distinct from the implementation 100 shown in FIG. 1 in that the light from the light sources is transmitted to the spatial light modulator 408 by the homogenizing lens 450. In various implementations, the homogenizing lens 450 can have dimensions and a focal length similar to those described above for the field lens. Similarly, the spatial light modulator, the light sources, and the field lens dimensions described elsewhere herein also apply to the implementation of FIG. 4. However, in view of the addition of homogenizing lens, the length of the overall projector of the implementation illustrated in FIG. 4 can be, in some implementations, one focal length longer than the length of the overall projector of the implementation illustrated in FIG. 1. The homogenizing lens 450 transmits light from the light sources 402 to the spatial light modulator 408 in such a way as to illuminate it with enhanced uniformity. The homogenizing lens 450 can be optically aligned with the optical axis of the field lens 420. In addition, the homogenizing lens 450 can be separated from the output plane of the array of light sources 402, along the optical axis, by the focal length FL2 of the homogenizing lens 450. The homogenizing lens 450 can also be separated from the spatial light modulator 408 by the focal length FL2. In some implementations, the spatial light modulator 408 is separated from the homogenizing lens 450 by FL2 exactly, within manufacturing tolerances. The result is that brightness variations across the output plane of the array of light sources 402, located at the distance FL2 below the homogenizing lens 450, are averaged at a "plane of enhanced uniformity," which is located at the distance FL2 above the homogenizing lens 450.

This is illustrated by the light beams 410 (410a, 410b, and 410c), 412 (412a, 412b, and 412c), and 414 (414a, 414b, and 414c) in FIG. 4. The individual light rays in each of the beams 410, 412, and 414 are shown emanating from each of three different points at the output plane of the array of light sources 402. Specifically, light rays 410c, 412c, and 414c are shown emanating from a point on the left-hand side of the output plane of the array of light sources 402, while light rays 410b, 412b, and 414b emanate from the middle, and light rays 410a, 412a, and 414a emanate from a point on the right-hand side. As illustrated, each point on the "plane of enhanced uniformity," where the spatial light modulator 408 is positioned, receives light from each of the points (i.e., left-hand, middle, and right-hand) at the output plane of the array of light sources 402. Thus, the light from each point on the output plane of the array of light sources 402 is combined at each point on the "plane of enhanced uniformity." In other words, the light rays 410a, 410b, and 410c from the right-hand, center, and left-hand points on the output plane of the array of light sources 402 are all combined by the homogenizing lens 450 at substantially a single point on the "plane of enhanced uniformity" where the spatial light modulator 408 is located. The same is true of the light rays 412a, 412b, and 412c, as well as the light rays 414a, 414b, and 414c. The result is that brightness variations across the output plane of the array of light sources 402 are averaged at the "plane of enhanced uniformity." Since the spatial light modulator 408 is located at the "plane of enhanced uniformity," there is more uniform illumination of the spatial light modulator. Thus, any artifacts in the projected pattern that may have been due to brightness variations in the illumination of the spatial light modulator 408 can be reduced or eliminated.

Figure 5:
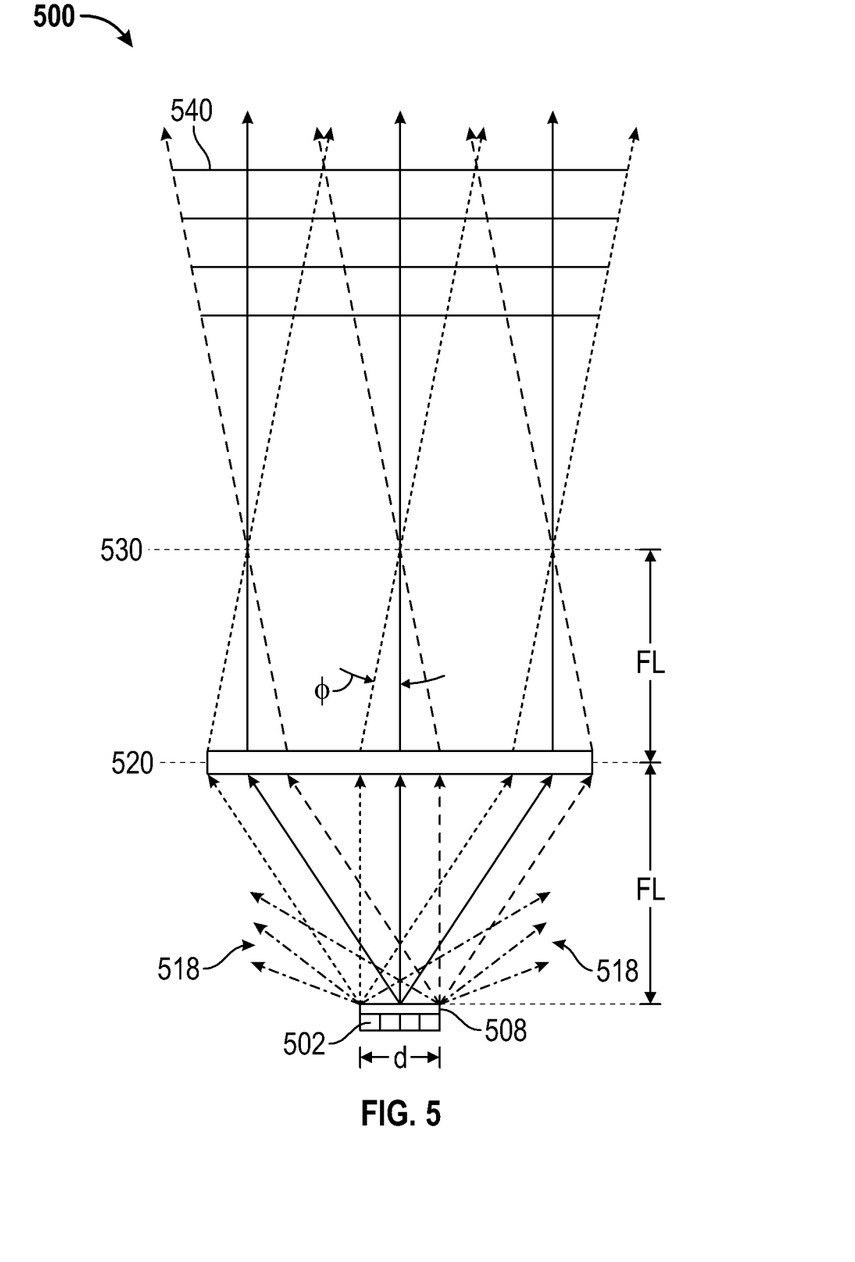
FIG. 5 is a schematic illustration of an example of a projector similar to the one illustrated in FIG. 1 but without reflectors.

FIG. 5 is a schematic illustration of an example of a projector 500 similar to the one illustrated in FIG. 1 but without reflectors. The array of light sources 502, the spatial light modulator 508, and the field lens 520 can be designed and arranged similarly to others described herein (e.g., 102, 108, and 120, respectively, in FIG. 1). However, the projector 500 is simplified, as compared to others described herein (for example, 100 in FIG. 1), by eliminating the array of reflectors from the array of light sources 502. As a result of the absence of the array of reflectors, some light from the array of light sources 202 is wasted because it does not reach the clear aperture of the field lens 520. This is indicated in FIG. 5 by the wide-angle dash-dot rays 518.

These light rays 518 are emitted from the array of light sources 502 at angles that are outside the angular aperture of the field lens 520. As such, these wasted light rays 518 do not pass through the field lens 520 and, therefore, do not contribute to formation of a light pattern 540 corresponding to the spatial light modulator 508. While the optical design of the projector 500 is simplified, and the cost reduced, by omitting an array of, for example, etendue-preserving reflectors, this is done at the expense of decreasing the efficiency of the device. However, this cost/efficiency tradeoff may be desirable in some applications.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A projection device comprising:
    a first lens, the first lens having a first focal length and a first optical axis;
    a spatial light modulator positioned substantially one first focal length away from the first lens along the first optical axis; and
    a light source configured to illuminate the spatial light modulator, wherein the light source includes a light emitter and an etendue-preserving reflector,
    wherein the device is configured to project a pattern created by the spatial light modulator at a distance using light from the light source.

2. The projection device of claim 1, wherein the spatial light modulator is adjacent an output plane of the light source.

3. The projection device of claim 1, wherein the etendue-preserving reflector is configured to substantially direct a beam of light from the light source into a clear aperture of the first lens.

4. The projection device of claim 1, wherein the etendue-preserving reflector is configured to substantially direct a beam of light from the light source into an acceptance cone of the first lens.

5. The projection device of claim 1, wherein the light source includes an array of light emitters.

6. The projection device of claim 5, wherein the light source includes an array of etendue-preserving reflectors corresponding to the array of light emitters.

7. The projection device of claim 6, wherein there is a one-to-one correspondence between each of the light emitters in the array of light emitters and each of the reflectors in the array of etendue-preserving reflectors.

8. The projection device of claim 5, further comprising a second lens, the second lens having a second focal length and a second optical axis that is aligned with the first optical axis, the second lens being positioned substantially one second focal length away from the spatial light modulator on a side of the spatial light modulator opposite the first lens,
    wherein the light source is configured to illuminate the clear aperture of the second lens, and
    wherein the output plane of the light source is positioned substantially one second focal length away from the second lens such that the light source and the second lens together provide enhanced uniformity of light at the location of the spatial light modulator.

9. The projection device of claim 1, wherein the spatial light modulator is transmissive.

10. The projection device of claim 1, wherein the spatial light modulator is controllable to create any of a plurality of patterns.

11. The projection device of claim 1, wherein the spatial light modulator includes a liquid crystal display panel or an array of interferometric modulators.

12. The projection device of claim 1, wherein the device does not include a mechanism for adjusting the focus of the device.

13. A method of fabricating a projection device, the method comprising:
    providing a first lens, the first lens having a first focal length and a first optical axis;
    providing a spatial light modulator positioned substantially one first focal length away from the first lens along the first optical axis; and
    providing a light source configured to illuminate the spatial light modulator, wherein the light source includes a light emitter and an etendue-preserving reflector,
    wherein the device is configured to project a pattern created by the spatial light modulator at a distance using light from the light source.

14. The method of claim 13, wherein the spatial light modulator is provided adjacent an output plane of the light source.

15. The method of claim 13, wherein the etendue-preserving reflector is configured to substantially direct a beam of light from the light source into a clear aperture of the first lens.

16. The method of claim 13, wherein the etendue-preserving reflector is configured to substantially direct a beam of light from the light source into an acceptance cone of the first lens.

17. The method of claim 13, wherein the light source includes an array of light emitters.

18. The method of claim 17, wherein the light source includes an array of etendue-preserving reflectors corresponding to the array of light emitters.

19. The method of claim 18, wherein there is a one-to-one correspondence between each of the light emitters in the array of light emitters and each of the reflectors in the array of etendue-preserving reflectors.

20. The method of claim 17, further comprising providing a second lens, the second lens having a second focal length and a second optical axis that is aligned with the first optical axis, the second lens being positioned substantially one second focal length away from the spatial light modulator on a side of the spatial light modulator opposite the first lens,
    wherein the light source is configured to illuminate the clear aperture of the second lens, and
    wherein the output plane of the light source is positioned substantially one second focal length away from the second lens such that the light source and the second lens together provide enhanced uniformity of light at the location of the spatial light modulator.

21. The method of claim 13, wherein the spatial light modulator is transmissive.

22. The method of claim 13, wherein the spatial light modulator is controllable to create any of a plurality of patterns.

23. The method of claim 13, wherein the spatial light modulator includes a liquid crystal display panel or an array of interferometric modulators.

24. The method of claim 13, wherein the device does not include a mechanism for adjusting the focus of the device.

25. A projection device comprising:
- means for producing a beam of light, wherein the light beam production means includes means for preserving etendue of the beam of light;
- means for producing a spatial pattern to be illuminated by the beam of light; and
- focusing means for imaging the spatial pattern production means, the focusing means being associated with a focal length and an optical axis, the focusing means being positioned substantially one focal length away from the spatial pattern production means along the optical axis,
- wherein the device is configured to project the spatial pattern at a distance.

26. The projection device of claim 25, wherein the light production means includes a light emitter and the etendue-preserving means includes a reflector, the spatial pattern production means includes a spatial light modulator, and the focusing means includes a lens.

* * * * *